(12) United States Patent
Sawyer et al.

(10) Patent No.: US 6,837,636 B2
(45) Date of Patent: Jan. 4, 2005

(54) IMAGER FEATURING SERVICE STATION ASSEMBLY FOR SERVICING IMAGER PRINT HEADS

(75) Inventors: George M. Sawyer, Norwich, CT (US); Theodore J. Langevin, Madison, CT (US); Richard H. Baylis, Jr., Essex, CT (US)

(73) Assignee: inc.jet Incorporated, Norwich, CT (US)

( * ) Notice: Subject to any disclaimer, the term of this patent is extended or adjusted under 35 U.S.C. 154(b) by 16 days.

(21) Appl. No.: 10/082,781

(22) Filed: Feb. 22, 2002

(65) Prior Publication Data

US 2002/0167563 A1 Nov. 14, 2002

Related U.S. Application Data

(63) Continuation-in-part of application No. 09/187,917, filed on Nov. 6, 1998, now Pat. No. 6,371,672.

(51) Int. Cl.[7] .............................................. B41J 29/02
(52) U.S. Cl. ......................... 400/692; 400/701; 347/22; 347/23
(58) Field of Search ........................... 400/701; 347/22, 347/23, 29

(56) References Cited

U.S. PATENT DOCUMENTS

| | | | | |
|---|---|---|---|---|
| 5,051,761 A | * | 9/1991 | Fisher et al. | 347/30 |
| 5,367,326 A | * | 11/1994 | Pond et al. | 347/22 |
| 5,610,640 A | * | 3/1997 | Anderson et al. | 347/32 |
| 5,889,535 A | * | 3/1999 | Jackson et al. | 347/22 |
| 6,027,264 A | * | 2/2000 | Maher et al. | 400/55 |
| 6,179,403 B1 | * | 1/2001 | Xie et al. | 347/23 |
| 2003/0128250 A1 | * | 7/2003 | Booth | 347/22 |

* cited by examiner

Primary Examiner—Charles H. Nolan, Jr.
(74) Attorney, Agent, or Firm—Ware, Fressola, Van Der Sluys & Adolphson LLP

(57) ABSTRACT

An imager has a cartridge assembly with a print head arranged directly over a production path. The print head vertically moves on an axis perpendicular to the plane of the production path for allowing the print head to be purged, cleaned, parked or a combination thereof, while the print head remains directly over the production path. The imager also includes a service station assembly having a waste ink receptacle that moves horizontally in relation to an axis parallel to the plane of the production path for purging, cleaning or parking the print head, or a combination thereof, while the print head remains directly over the production path.

19 Claims, 13 Drawing Sheets

(The Basic Invention Used in a Conveyor Application)

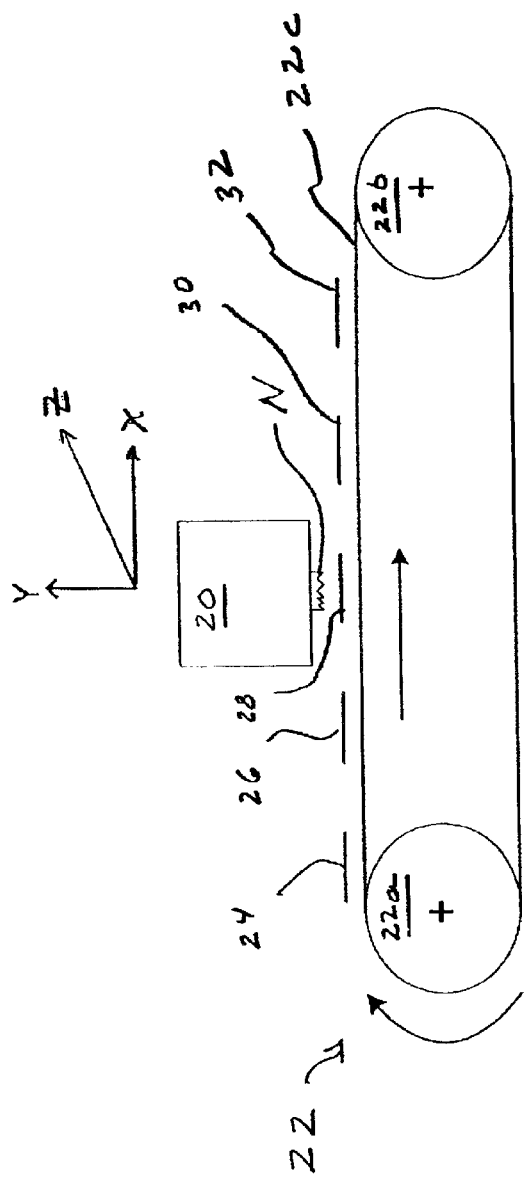
Figure 1 (The Basic Invention Used in a Conveyor Application)
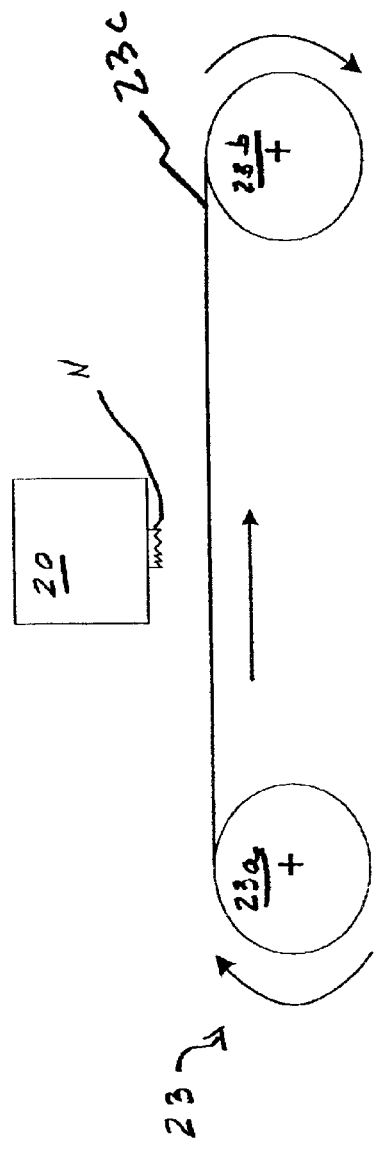
Figure 2 (The Basic Invention Used in a Continuous Web Application)

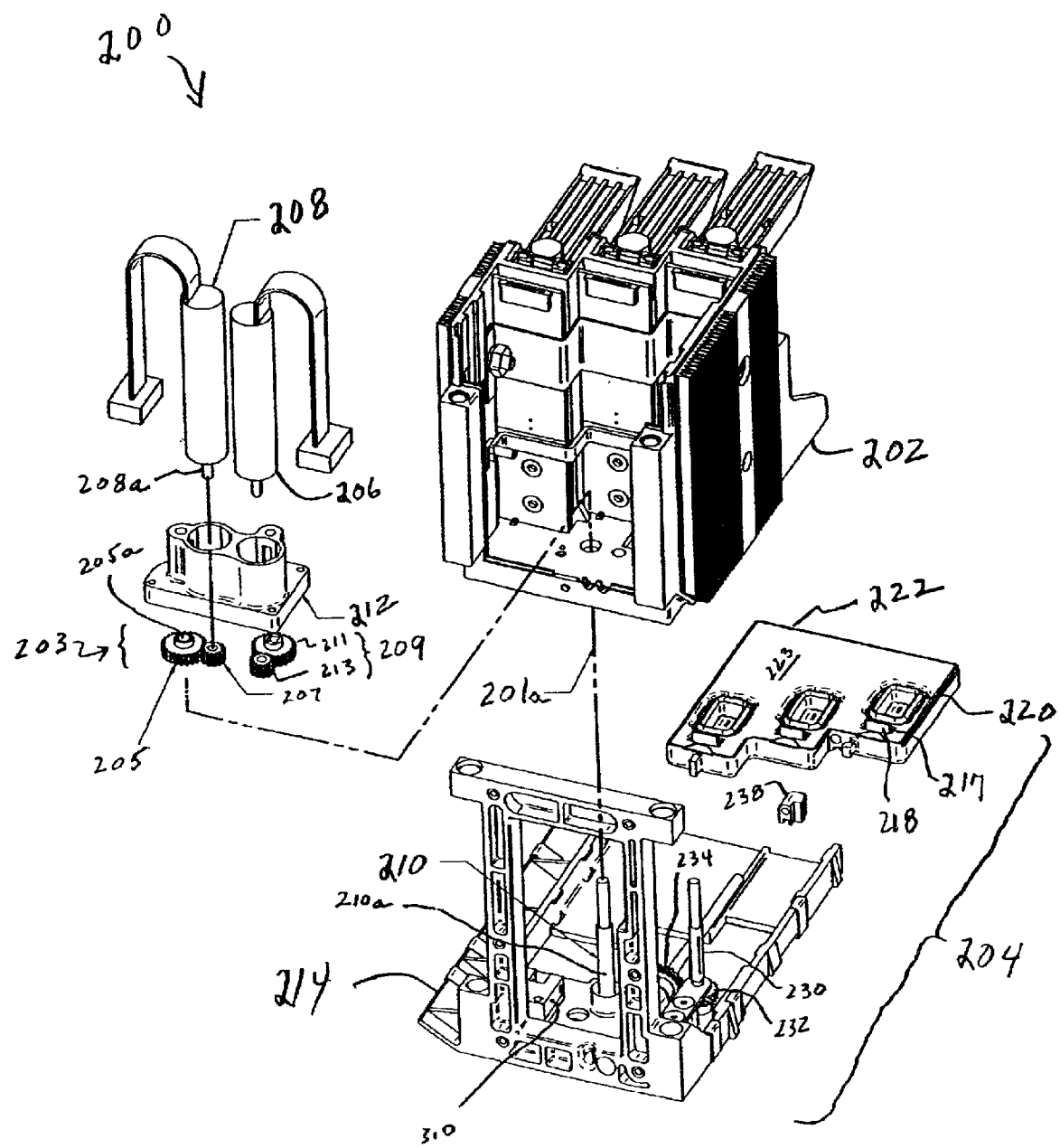
Figure 4 (Power Transmission Path for Cartridge Vertical Motion)

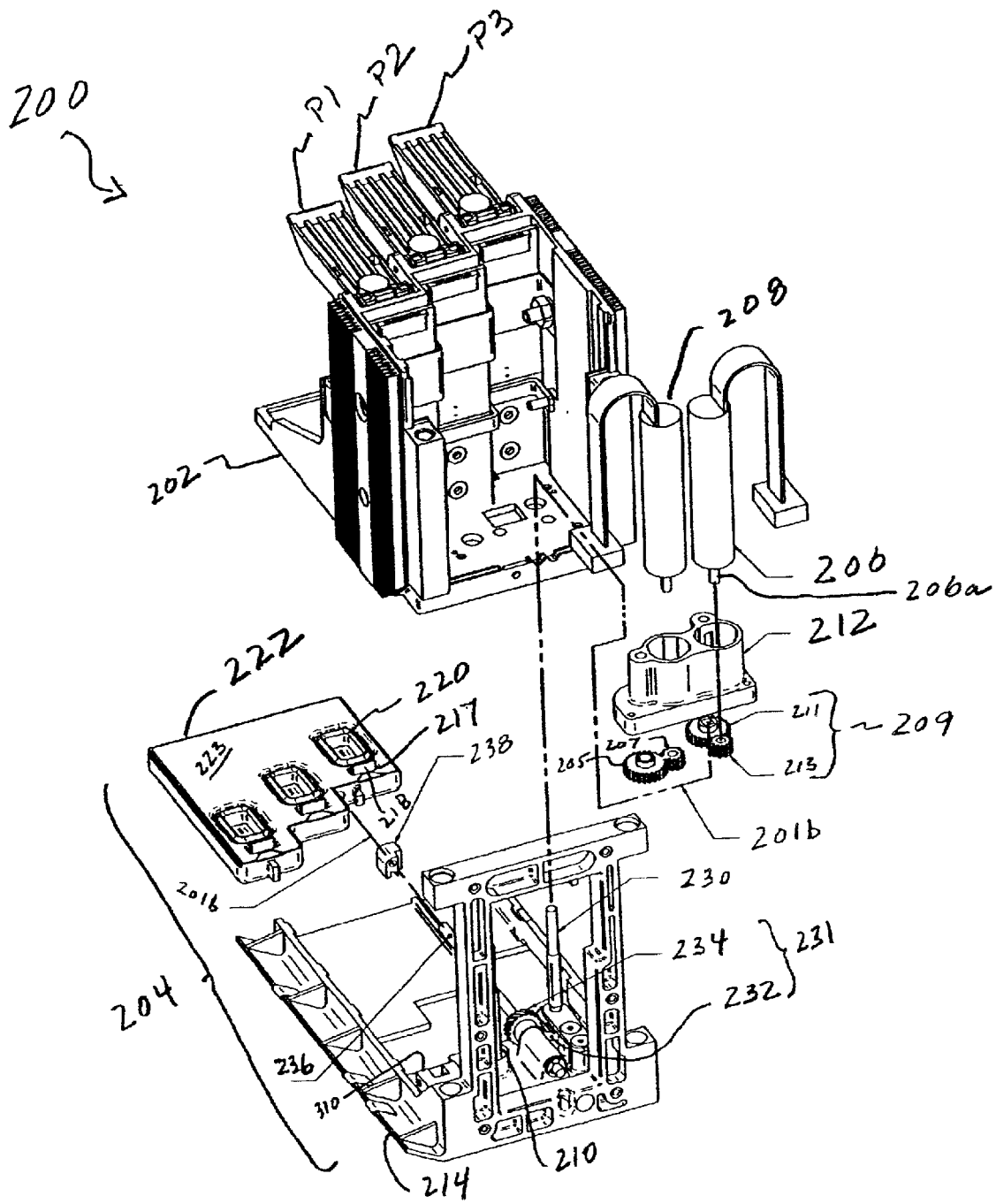
Figure 5 (Power Transmission Path for Waste Ink Receptacle Horizontal Motion)

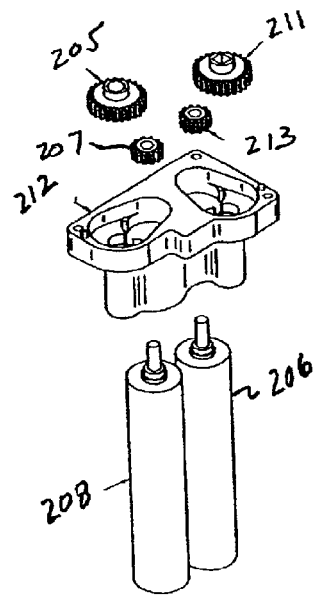
Figure 6 (Motor, Housing and Gear Assembly)
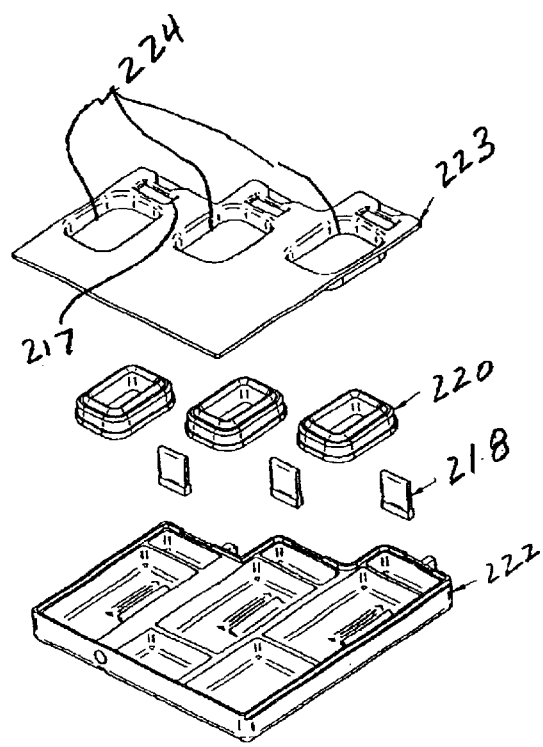
Figure 7 (Ink Receptacle Assembly)

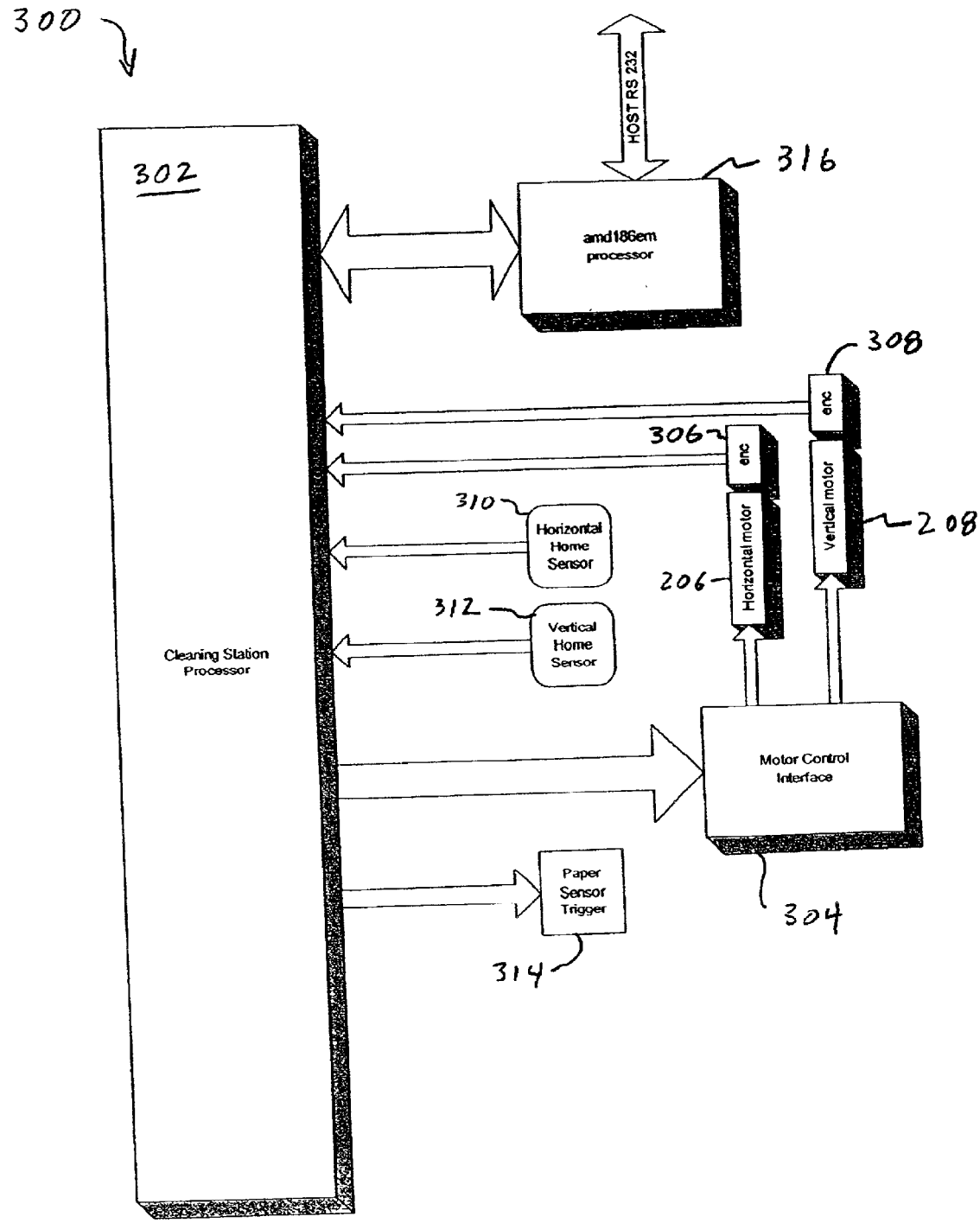
Figure 8 (Cleaning Station Control Assembly)

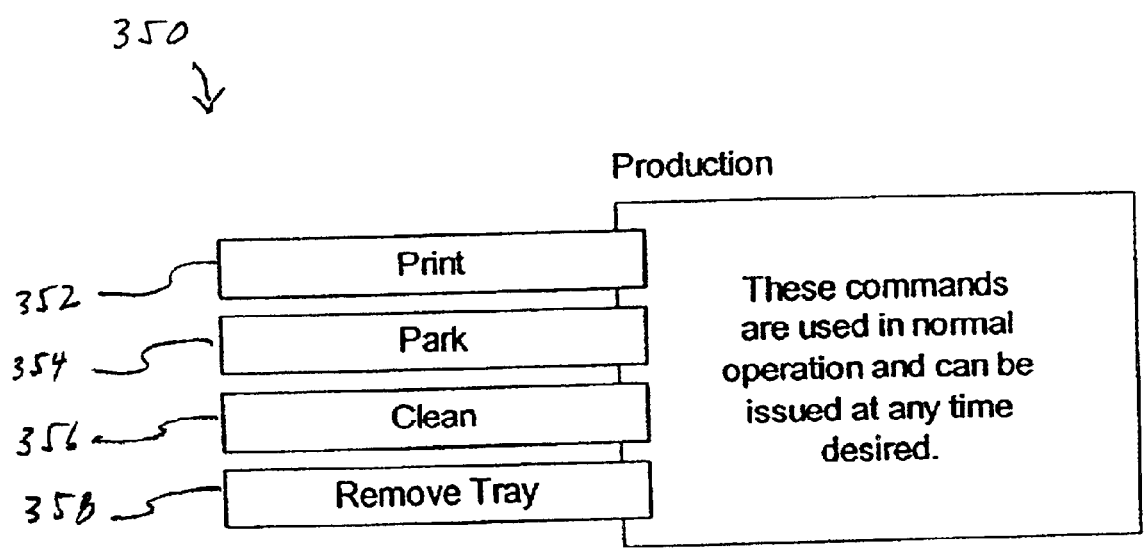
Figure 9 (Cleaning Station Commands)

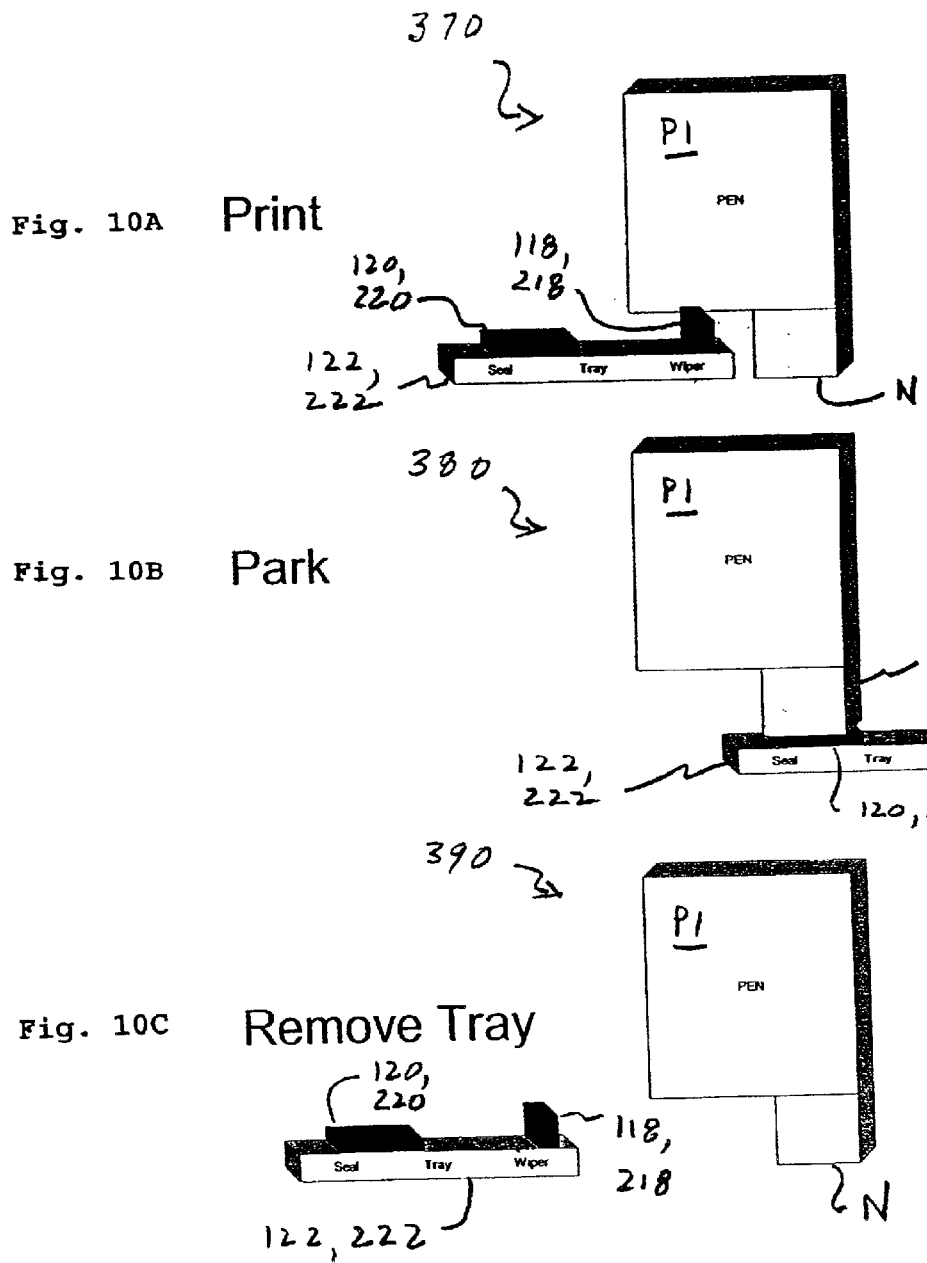
Figure 10 (Print, Park and Remove Tray Positions)

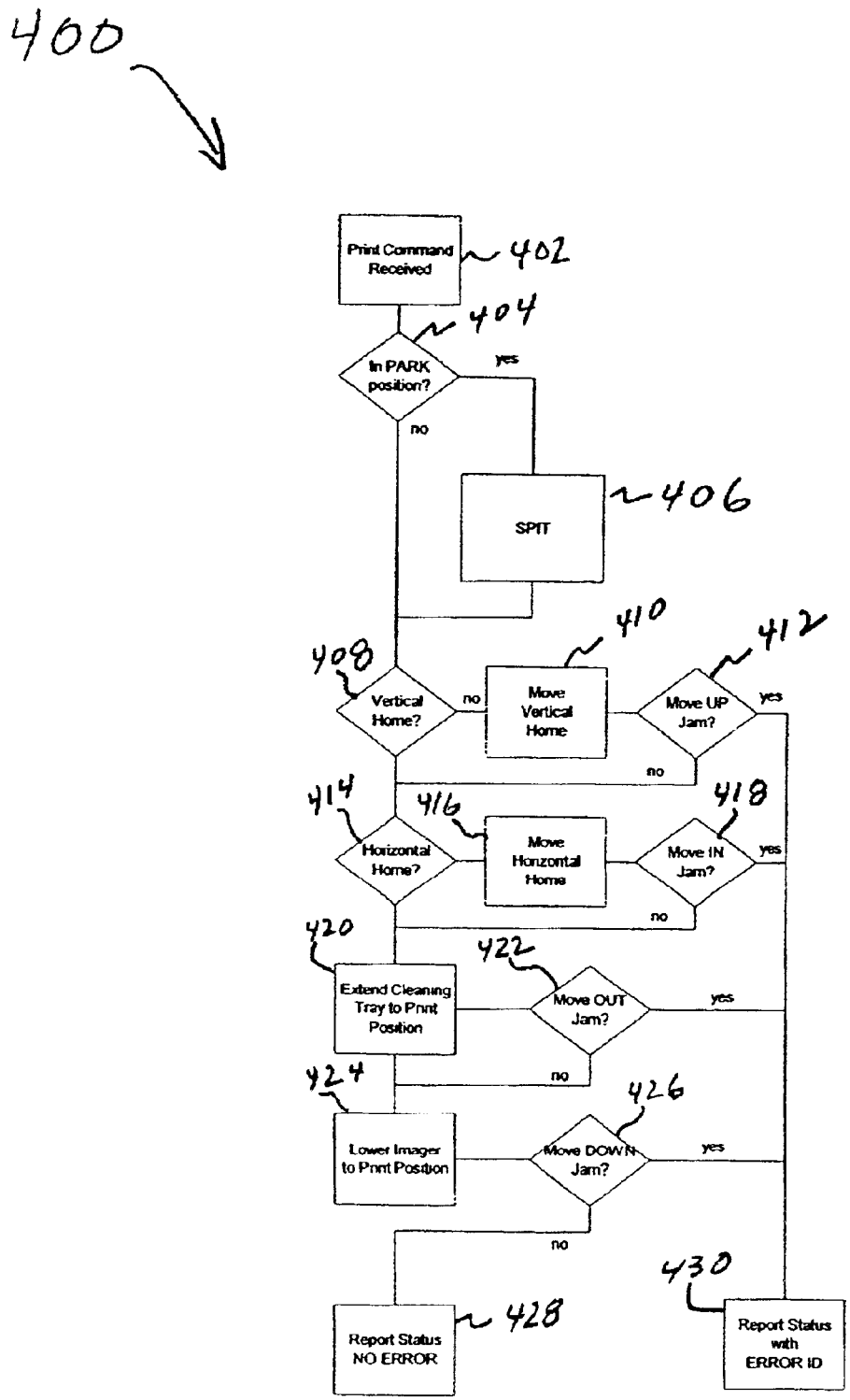
Figure 11 (Print Cycle Flowchart)

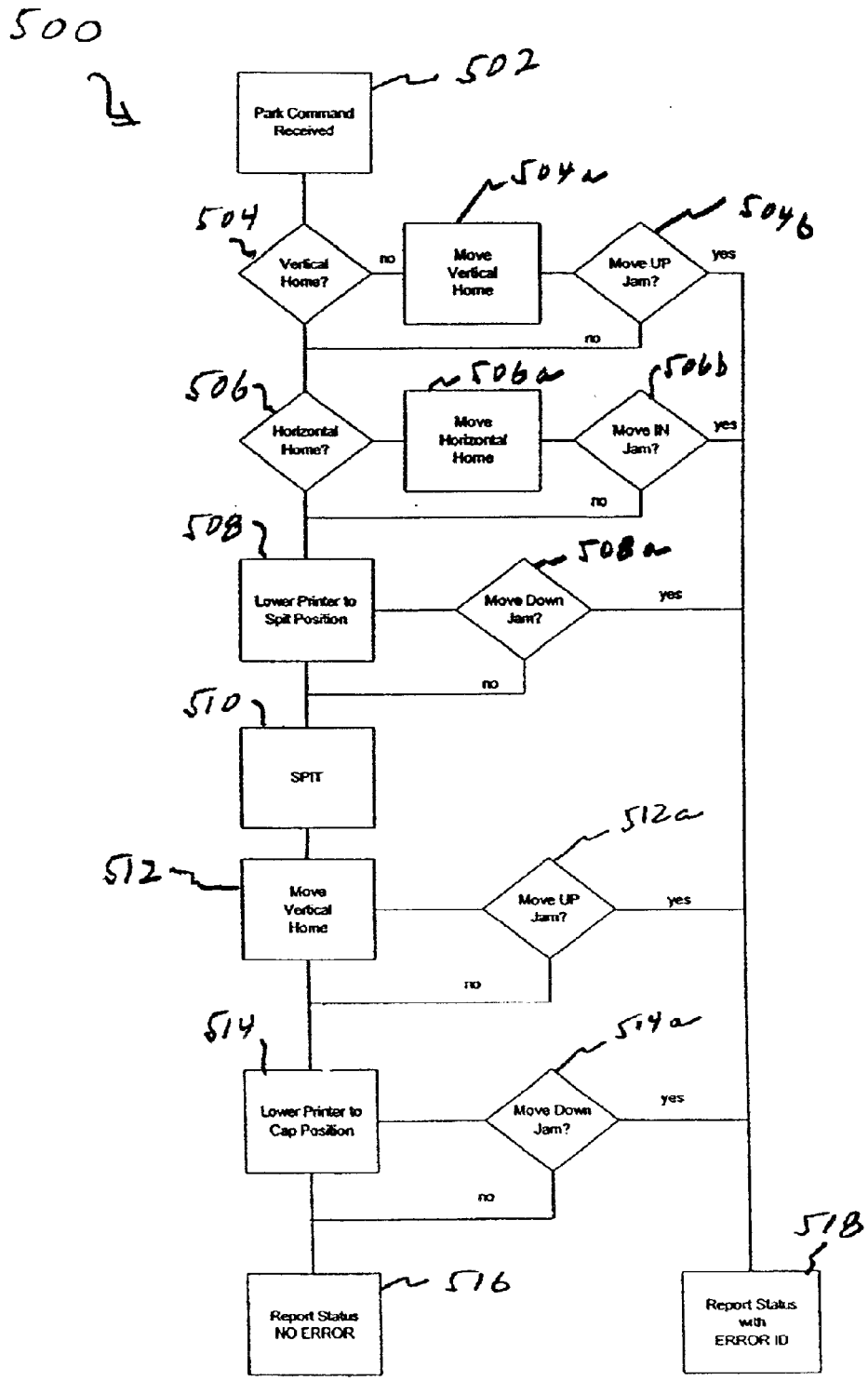
Figure 12 (Park Cycle Flowchart)

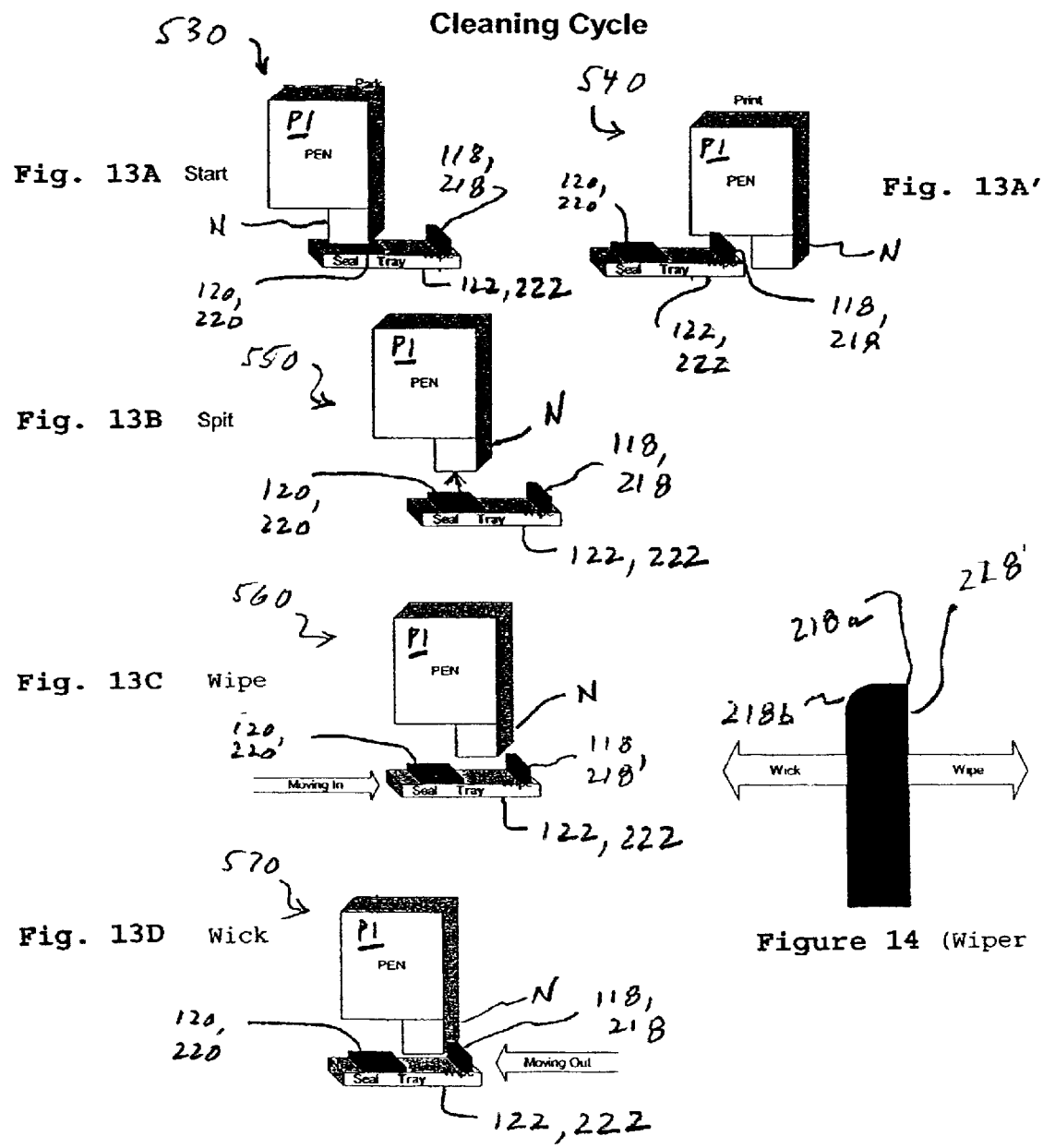
Figure 13 (Cleaning Cycle Positions)

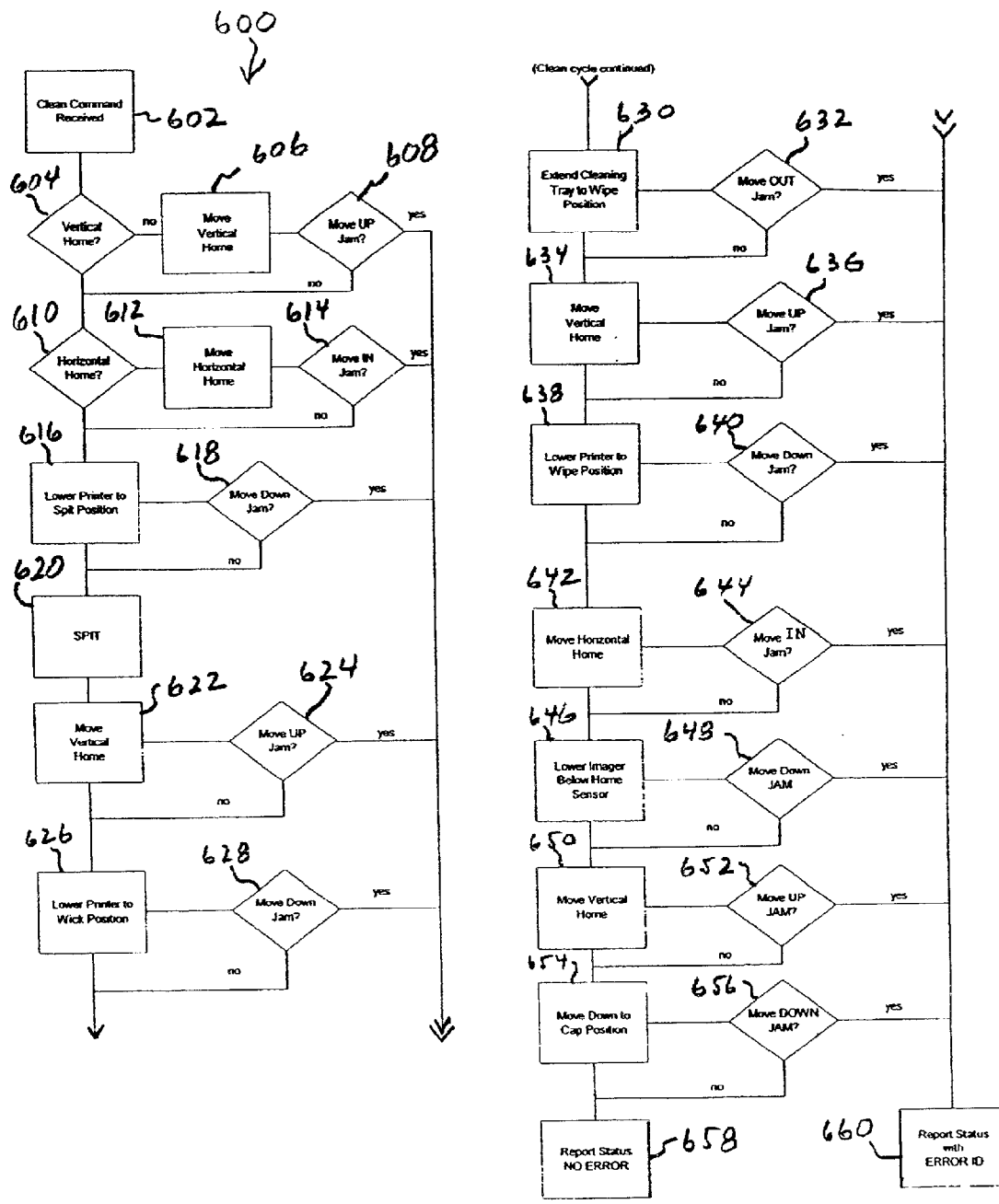
Figure 15 (Cleaning Cycle Flowchart)

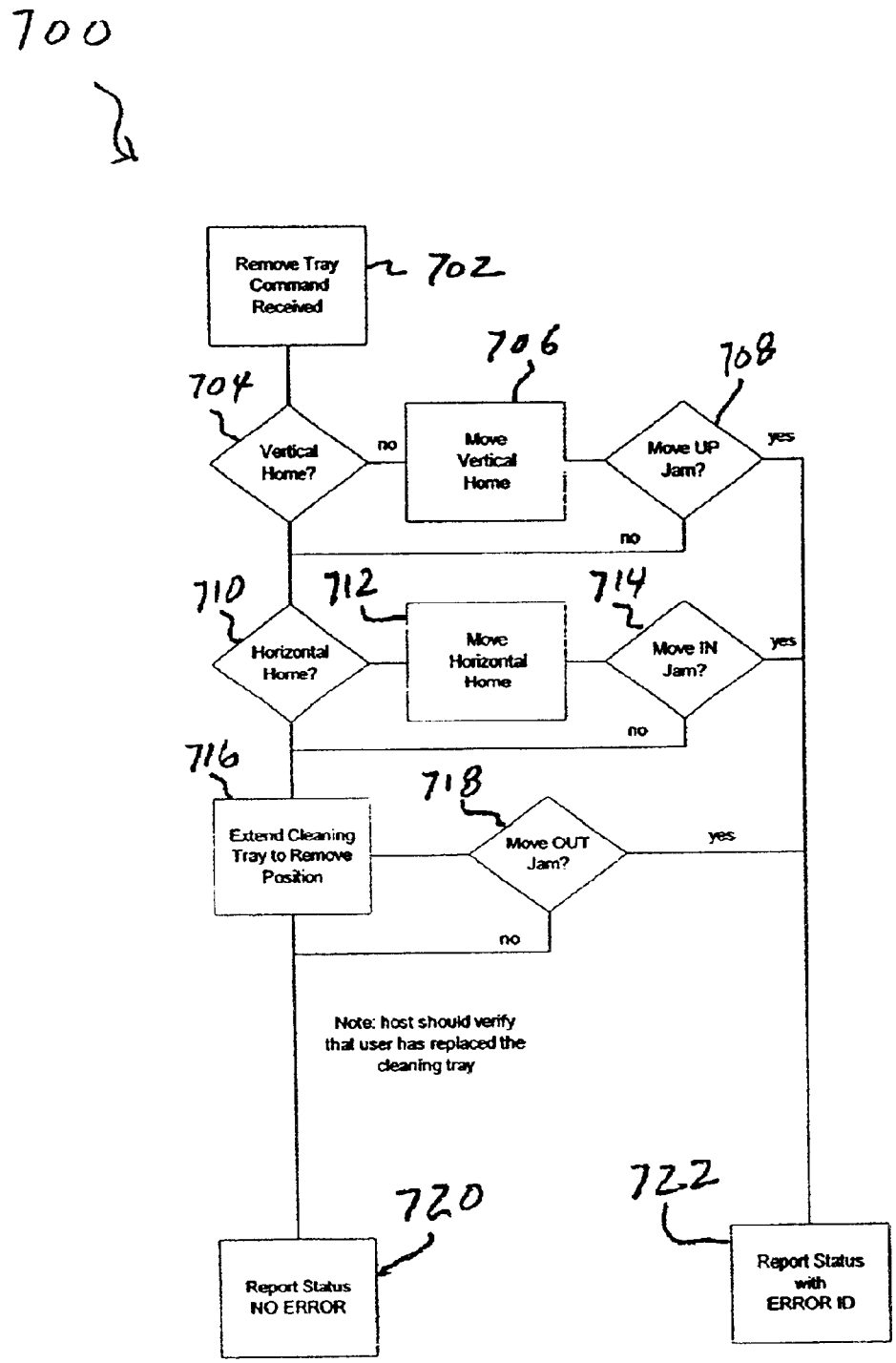
Figure 16 (Remove Tray Cycle Flowchart)

IMAGER FEATURING SERVICE STATION ASSEMBLY FOR SERVICING IMAGER PRINT HEADS

CROSS-REFERENCE TO A RELATED APPLICATION

This is a continuation-in-part application claiming benefit to application Ser. No. 09/187,917, filed Nov. 6, 1998 now U.S. Pat. No. 6,371,672, hereby incorporated by reference in its entirety.

Application Ser. No. 09/187,917 describes an imager device for printing paper or other product in a production path. The instant continuation-in-part application is based on the subject matter shown and described in relation to FIG. 13 of application Ser. No. 09/187,917. For the convenience of the reader, it is noted that the detailed description of FIGS. 1–12 of the imager disclosed in application Ser. No. 09/187,917 have been eliminated from this continuation-in-part application. Moreover, FIG. 3 of this continuation-in-part application corresponds to FIG. 13 of application Ser. No. 09/187,917, which shows the subject matter of the present invention. The reader is referred to application Ser. No. 09/187,917, including the detailed description of that shown in FIGS. 1–12 thereof, for a more detailed description of features of the imager device that are not germane to the whole thrust of the subject matter of the present invention shown and described herein.

BACKGROUND OF THE INVENTION

1. Field of the Invention

The present invention relates to a method and apparatus for printing an image on a paper or product in a production path; and more particularly, to a method and apparatus for purging, cleaning and parking one or more print heads of such an imager.

2. Description of the Related Art

Known printing systems have print heads arranged over printing or production paths designed to print thousands of product per hour. The printing paths may be adapted to provide printed product that may include sheets of paper, envelopes, boxes, etc.

The known printing systems have one or more print heads that must be periodically serviced in order to maintain the quality of print provided on the printed product. The servicing typically includes cleaning the print head. During a cleaning cycle, the printing system is not printing the product so it is desirable to clean the print heads as quickly as possible to maximize the printing throughput of the printing system. For example, if the cleaning cycle takes two to three minutes to clean the print heads, then two to three hundred units of printed product may not be printed per cleaning cycle. Moreover, if the print heads have to be cleaned, for example, once per hour, then two to three thousand units of printed product may not be printed during a ten hour business day. Therefore, there is an economic advantage to cleaning the print heads as quickly and efficiently as possible.

In one known printing system, the printing assembly must be moved laterally off and away from the printing or production path in order to wipe and clean the print heads. One disadvantage of this approach is that it takes time to move the printing assembly off the printing or production path, time to clean the print heads, and time to move the printing assembly back into the printing or production path to resume printing the product. Moreover, known systems also have to purge between the belts, purge on the belt or purge on a product that will be discarded. From a practical standpoint, an operator could likely remove and manually wipe the pens quicker than the cleaning station when done automatically.

In view of the aforementioned, there is a need in the industry to clean more quickly and efficiently print heads arranged in a printing or production path. There is also a need in the industry to prevent pen dry-out and provide no print loss on a first image sprayed after a period of inactivity (as little as 30 seconds).

SUMMARY OF THE INVENTION

The present invention provides an imager having one or more print heads for arranging directly over a production path. The production may be either a conveyor belt having products moving underneath the imager to be printed, or a continuous web moving underneath the imager to be printed.

The imager includes a cartridge assembly and a service station assembly.

The cartridge assembly has a print cartridge with a print head that vertically moves on an axis perpendicular to the plane of the production path for allowing the print head to be purged, cleaned, parked, or a combination thereof, while the print head remains directly over the production path.

The service station assembly has a waste ink receptacle assembly that horizontally moves in relation to an axis parallel to the plane of the production path for purging, cleaning or parking the print head, or a combination thereof, while the print head remains directly over the production path.

The waste ink receptacle assembly is a snap-in disposable assembly consisting of a reservoir for waste ink, soft rubber capping seals and soft rubber print head wipers. The reservoir may contain porous foam or cloth for absorption and dispersion of waste ink. The waste ink receptacle assembly slides within the service station assembly by way of software commanded motors. The service station assembly performs functions of pen wiping and cleaning, proper nozzle firing verification and capping of the print heads (also known as pens) when not in use.

The cartridge assembly includes a cartridge lift motor for lifting the cartridge assembly a precise distance at predetermined intervals or upon command in relation to the service station assembly. The cartridge assembly includes a wiper/ink receptacle driver motor for driving the waste ink receptacle assembly under the noses of the print heads thereby wiping pen nozzle areas to remove excess ink residue.

The wiper/ink receptacle driver motor retracts the waste ink receptacle assembly to allow resumed printing, or the cartridge assembly lift motor lowers the cartridge assembly to allow the soft rubber capping seals to cap the pens to prevent drying of the pen nozzles until the next use.

In one embodiment, each print head is an ink jet pen, which are also known as an inkjet cartridge and generally designed for a single use application. When the ink in the inkjet cartridge is depleted it is simply discarded. The inkjet cartridges do, however, require "servicing" in order to maintain optimum print quality throughout their life. This servicing typically includes:

1. Capping the pens when not in use, because the ink is water based and will dry out and clog the ink jet nozzles if not capped when not in use.

2. The face of the pen will periodically require wiping to remove debris (paper dust) that can misdirect the ink spray resulting in poor quality print.

3. The pens may also require purging (spitting) to clear clogged nozzles, and the imager provides an integral receptacle for collecting this waste ink and maintaining a clean operating environment.

In the imager of the present invention, the service station assembly will wipe the pens, provide for spitting to clean the nozzles, and cap the pens to prevent them from drying out when not in use.

The service station assembly provides a printer that will consistently provide a high quality and very reliable ink jet printing, with little or no operator intervention. The service station may be programmed to take care of all of the required servicing for the ink jet cartridges automatically on a periodic basis.

This is especially important in integrated or highly automated production environments that require a high degree of reliability and integrity, which cannot afford down time resulting from required operator intervention.

The imager of the present invention also has a very space-saving, compact modular design that can sold as an OEM device, easily be integrated in industrial printing systems and easily cleaned on-line.

Finally, the imager of the present invention use a new and unique "Above Paper Path" design, which provides for the ultimate in flexibility in that it does not require that there be access to the bottom of the imager.

The invention will be fully understood when reference is made to the following detailed description taken in conjunction with the accompanying drawings.

BRIEF DESCRIPTION OF THE DRAWING

FIG. 1 is a diagram of the basic invention used in a cut sheet conveyor application, having a production path and an imager arranged in relation thereto.

FIG. 2 is another diagram of the basic invention used in a continuous web application, having a production path and an imager arranged in relation thereto.

FIG. 3 is substantially similar to FIG. 13 in application Ser. No. 09/187,917, except for the re-numbering of the reference numerals. For the convenience of the reader, the labelling of the reference numerals in FIG. 3 is substantially consistent with the labelling of the references numerals in FIG. 13 of application Ser. No. 09/187,917.

FIG. 4 is a diagram of an exploded view of the imager showing a power transmission path for cartridge vertical motion.

FIG. 5 is a diagram of an exploded view of the imager showing a power transmission path for waste ink receptacle horizontal motion.

FIG. 6 is a diagram of an exploded view of a motor, a power transmission housing, and a gear assembly similar to that shown in FIGS. 3–5.

FIG. 7 is a diagram of an exploded view of an ink receptacle assembly similar to that shown in FIGS. 3–5.

FIG. 8 is a diagram of a cleaning station control circuit assembly.

FIG. 9 is a diagram of cleaning station commands.

FIG. 10A is a diagram of a print position for a pen and a waste ink receptacle tray of an imager similar to that shown in FIGS. 3–5.

FIG. 10B is a diagram of a park position for a pen and a waste ink receptacle tray of an imager similar to that shown in FIGS. 3–5.

FIG. 10C is a diagram of a remove tray position for a pen and a waste ink receptacle tray of an imager similar to that shown in FIGS. 3–5.

FIG. 11 is a flowchart of steps in a print cycle.

FIG. 12 is a flowchart of steps in a park cycle.

FIG. 13, including FIGS. 13A, 13A', 13B, 13C and 13D, contains diagrams of a cleaning cycle.

FIG. 13A is a diagram of a start position for a pen and a waste ink receptacle tray in the cleaning cycle.

FIG. 13A' is a diagram of a print position for a pen and a waste ink receptacle tray in the cleaning cycle.

FIG. 13B is a diagram of a spit position for a pen and a waste ink receptacle tray in the cleaning cycle.

FIG. 13C is a diagram of a wipe position for a pen and a waste ink receptacle tray in the cleaning cycle.

FIG. 13D is a diagram of a wick position for a pen and a waste ink receptacle tray in the cleaning cycle.

FIG. 14 is a diagram of a wiper profile of a wiper of an ink receptacle assembly shown in FIGS. 3–5.

FIG. 15 is a flowchart of steps in a cleaning cycle.

FIG. 16 is a flowchart of steps in a remove tray cycle.

DETAILED DESCRIPTION OF THE INVENTION

Figure 3:
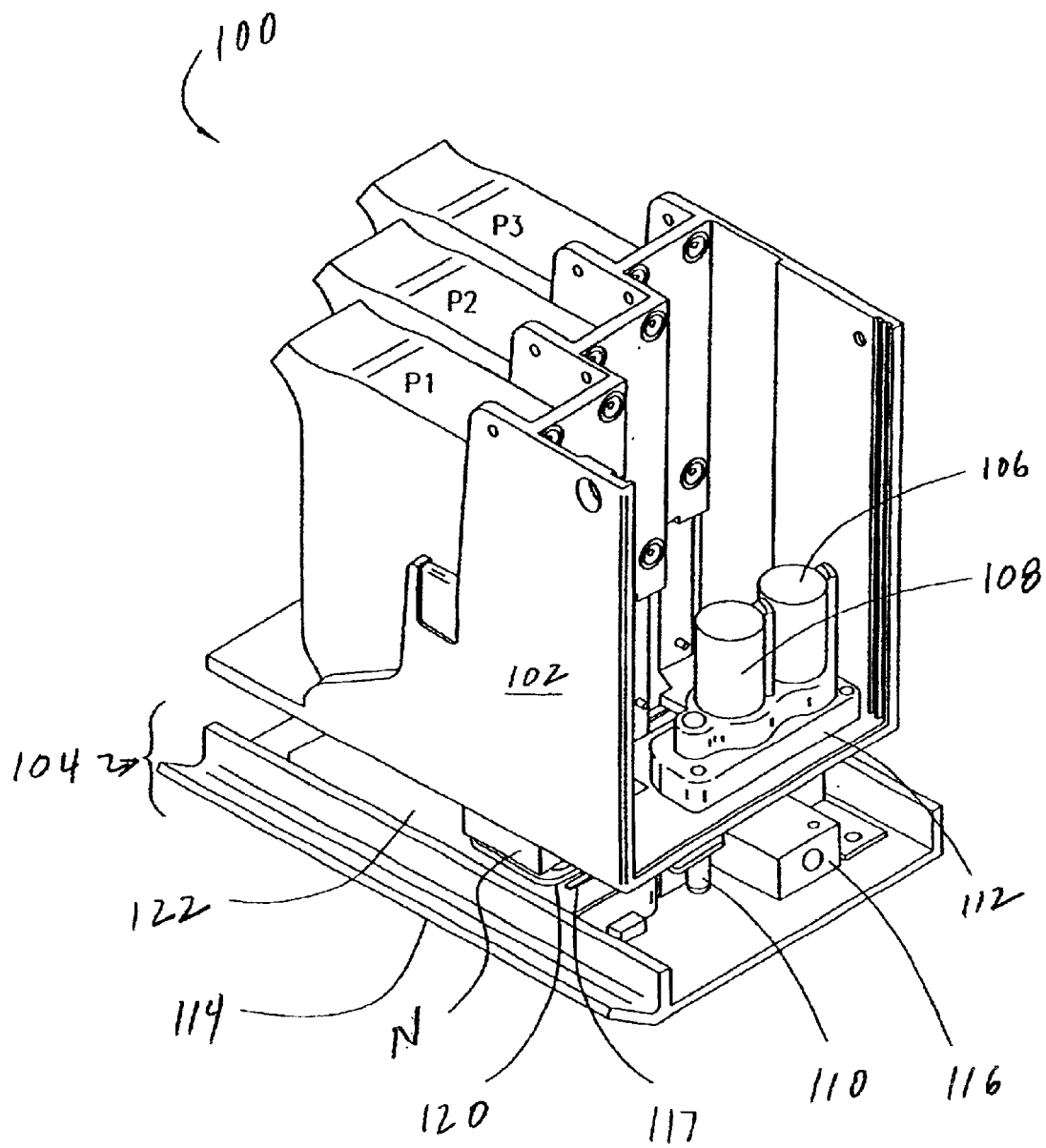
FIG. 3 is a diagram of an imager that is the subject matter of the present invention.

FIGS. 1 and 2: The Basic Invention and Production Path

FIGS. 1–2 show an imager generally indicated as 20 having a print head generally indicated as N arranged directly over a production path generally indicated as 22 in FIGS. 1 and 23 in FIG. 2.

In FIG. 1, the production path 22 is a conveyor application having two rollers 22a, 22b and a conveyor belt 22c having products 24, 26, 28, 30, 32 moving thereon and underneath the imager to be printed.

In FIG. 2, the production path 23 is a continuous web application having two rollers 23a, 23b and a continuous web 23c moving underneath the imager 20 to be printed.

During servicing operations shown and described herein, the print head N moves vertically on an axis perpendicular to the plane of the production path 22 for allowing the print head N to be purged, cleaned, parked, or a combination thereof, while the print head N remains directly over the production path 22.

As shown in the coordinate system above the imager 20 in FIG. 1, the perpendicular axis is defined along the vertical axis Y, and the plane of the production path 22 is defined as the X–Z plane, which is the plane parallel to the flat surface conveyor belt 22c or of the continuous web 23c.

The whole thrust of the present invention is to vertically move the print head N on and along the axis Y perpendicular to the X–Z plane of the production path 22 for allowing the print head N to be purged, cleaned, parked, or any combination thereof.

The applications of the invention in FIGS. 1–2 are shown by way of example, and the scope of the invention is not intended to be limited to any particular type of application in which the imager is used.

FIG. 3: The Imager 100

FIG. 3 shows an embodiment of an imager generally indicated as 100 having a cartridge assembly generally indicated as 102 in relation to a service station assembly generally indicated as 104 related thereto for purging, wiping and cleaning nozzles of pens generally indicated as $P_1$, $P_2$, $P_3$ arranged in the cartridge assembly 100.

As shown, the cartridge assembly 102 includes a wiper and ink receptacle drive motor 106, a cartridge lift motor 108, a cartridge lift shaft 110, and a power transmission device 112. The wiper and ink receptacle drive motor 106 and the cartridge lift motor 108 are stepper motors that are known in the art.

The service station assembly 104 includes an integral product registration guide 114, a receptacle driver pillow block 116, a pen wiper slot 118, a soft rubber capping seal 120 and a waste ink receptacle assembly 122.

The waste ink receptacle assembly 122 is a snap in, disposable assembly consisting of a plastic reservoir for waste ink, the soft rubber capping seals 120 and soft rubber pen wipers (not shown, see FIG. 7). The plastic reservoir may be filled with porous foam (not shown) for absorption and dispersion of waste ink. The waste ink receptacle assembly 122 slides underneath and within the service station assembly 104 (also known as the imager base) by way of software commanded motors. The service station assembly 104 performs the functions of pen wiping and cleaning, proper nozzle firing verification and capping of the pens when not in use, as shown and described below.

Via software control, at predetermined intervals or upon command, the cartridge lift motor 108 lifts the cartridge assembly 102 a precise distance. The wiper/ink receptacle driver motor 108 then drives the waste ink receptacle assembly 122 under the ink jet pen nose generally indicated as N (of pen P1) thereby wiping the pen nozzle areas to remove excess ink residue. After wiping, the pens can then be fired on command into the waste ink receptacle to clear out possibly clogged nozzles. The pens can also be fired to print out a test pattern that can be visually inspected for clogged nozzles. The waste ink receptacle assembly 122 can then be either retracted to allow resumed printing or the cartridge assembly 102 can be lowered precisely to allow the seals to cap the pens to prevent drying of the nozzles until next use. Via software control, the waste ink receptacle assembly 122 can be retracted fully allowing it to be grasped and removed from the imager for disposal and replacement.

FIG. 4: Power Transmission Path for Cartridge Vertical Motion

FIG. 4 shows an imager 200 with a dashed line indicating a power transmission path 201*a* for cartridge vertical motion.

In the imager 200, the power transmission path 201*a* includes a mechanical coupling having a cartridge lift motor 208, a gear assembly generally indicated as 203 and a vertical drive screw 210 for vertically moving one or more print heads N (see FIGS. 1–3). As shown, the cartridge assembly 202 has the cartridge lift motor 208 and the gear assembly 203 arranged therein, while the service station assembly 204 has the vertical drive screw 210 attached thereto.

The gear assembly 203 has a vertical drive gear 205 with inner threads 205*a* for coupling to outer threads 210*a* of the vertical drive screw 210. The gear assembly 203 has a pinion gear 207 coupled between the vertical drive gear 205 and a shaft 208*a* of the cartridge lift motor 208. As best shown in FIG. 6, the vertical drive gear 205 and the pinion gear 207 are arranged in a power transmission housing 212 of the cartridge lift motor 208.

The implementation of the power transmission path 201*a* for cartridge vertical motion in FIG. 4 is shown and described herein by way of example. However, the scope of the invention is not intended to be limited to any particular type of power transmission path for cartridge vertical motion. For example, the scope of the invention is intended to include other types of power transmission path for cartridge vertical motion that fall within the spirit of the present invention. The inventors envision that many different types of power transmission path for cartridge vertical motion may be implemented by a person skilled in the art after reading that disclosed in the instant patent application.

FIG. 5: Power Transmission Path for Waste Ink Receptacle Horizontal Motion

FIG. 5 shows the imager 200 with a dashed line indicating a power transmission path 201*b* for ink receptacle assembly horizontal motion.

In the imager 200, the ink receptacle assembly 222 moves horizontally in relation to an axis parallel to the plane of the production path (see FIGS. 1 and 2) for purging, cleaning or parking the one or more print heads N (see FIGS. 1–3), or a combination thereof, while the one or more print heads N (see FIGS. 1–3) remain directly over the production path (see FIGS. 1 and 2).

In the imager 200, the power transmission path 201*b* includes a mechanical coupling having an ink receptacle drive motor 206, a first gear assembly generally indicated as 209, a square drive shaft 230, a second gear assembly generally indicated as 231 and a receptacle drive shaft 236 for horizontally moving the ink receptacle assembly 222. As shown, the cartridge assembly 202 has the receptacle drive motor 206 and the first gear assembly 209 arranged therein, and the service station assembly 204 has the square drive shaft 230, the second gear assembly 231 and the receptacle drive shaft 230 arranged therein.

The first gear assembly 209 has a square drive gear 211 for coupling to the square drive shaft 230. The first gear assembly 209 also has a pinion gear 213 for coupling between the square drive gear 211 and a shaft 206*a* of the receptacle drive motor 206. As best shown in FIG. 6, the square drive gear 211 and the pinion gear 213 are arranged in a power transmission housing 212 of the receptacle drive motor 206.

The second gear assembly 231 has two helical right gears 232, 234 coupled together. As shown, one helical right gear 232 connects to the square drive shaft 230, and the other helical right gear 234 connects to the receptacle drive shaft 236. A receptacle drive nut 238 connects the receptacle drive shaft 236 to the ink receptacle assembly 222. The ink receptacle assembly 222 is slidably arranged in the service station assembly 204.

The implementation of the power transmission path 201*b* for ink receptacle assembly horizontal motion in FIG. 5 is shown and described herein by way of example. However, the scope of the invention is not intended to be limited to any particular type of power transmission path for ink receptacle assembly horizontal motion. For example, the scope of the invention is intended to include other types of power transmission path for ink receptacle assembly horizontal motion that fall within the spirit of the present invention. The inventors envision that many different types of power transmission path for ink receptacle assembly horizontal motion may be implemented by a person skilled in the art after reading that disclosed in the instant patent application.

FIG. 7: Ink Receptacle Assembly

FIG. 7 shows in more detail the ink receptacle assembly 222, which includes a receptacle cover 223 having either one or more pen cap seals 220 for sealing one or more print heads N (see FIGS. 1–3), and one or more wipers 218 for wiping the ink off the one or more print heads N (see FIGS. 103).

FIG. 8: Cleaning Station Control Assembly

The imager 200 includes a cleaning station control circuit assembly generally indicated as 300 for vertically moving the one or more print heads N (see FIGS. 1–3), and for horizontally moving the ink receptacle assembly 222 (see FIG. 4). The cleaning station control circuit assembly 300 includes a cleaning station processor 302, a motor control interface 304, a horizontal motor 206 (as known above as a ink receptacle assembly motor), a vertical motor 208 (as known above as a cartridge lift motor), a horizontal encoder 306 and a vertical motor encoder 308.

The cleaning station processor 302 controls the operation of the circuit assembly 300, and a person skilled in the art would appreciate how to program the cleaning station processor 302 to implement the functionality of the present invention as shown and described herein.

The motor control interface 304 provides an interface between the cleaning station processor 302 and the horizontal motor 206 and the vertical motor 208. The horizontal encoder 306 and the vertical motor encoder 308 provide encoding signals back to the cleaning station processor 302 indicative of stepwise movement of the horizontal motor 206 and the vertical motor 208.

The cleaning station control circuit assembly 300 also includes a vertical home sensor (see also FIG. 5), a horizontal home sensor 312 and a paper sensor trigger 314.

The cleaning station control circuit assembly 300 also includes an interface processor 316 coupled to the cleaning station processor 302 for interfacing input and output information signals to and from the cleaning station control circuit assembly 300.

The implementation of the cleaning station control circuit assembly 300 in FIG. 8 is shown and described herein by way of example. However, the scope of the invention is not intended to be limited to any particular type of the cleaning station control circuit assembly. For example, the scope of the invention is intended to include other types of cleaning station control circuit assembly that fall within the spirit of the present invention. The inventors envision that many different types of cleaning station control circuit assembly may be implemented by a person skilled in the art after reading that disclosed in the instant patent application.

FIG. 9: Servicing Commands

The present invention provides a method for servicing one or more print heads N (see FIGS. 1–3) of the imager 100, 200 arranged directly over a production path, consistent with that shown and described in relation to FIGS. 1–8 herein. The method includes vertically moving the one or more print heads N (see FIGS. 1–3) on an axis perpendicular to the plane of the production path for allowing the print head N (see FIGS. 1–3) to be purged, cleaned, parked, or a combination thereof, while the print head N (see FIGS. 1–3) remains directly over the production path.

For example, as shown in FIG. 9, the method includes different servicing command steps including print command steps, park command steps, clean command steps and remove tray command steps, all discussed in more detail below.

FIG. 10: Print, Park and Remove Tray Positions

During the different servicing operations, the print head N and the ink receptacle assembly 222 are moved into different positions in relation to one another. FIG. 10 shows these different servicing positions.

For example, FIG. 10A shows print positions generally indicated as 370 of the print head N in relation to the ink receptacle assembly 222. As shown, the print head N is lowered into a print position.

FIG. 10B shows park positions generally indicated as 380 of the print head N in relation to the ink receptacle assembly 222. As shown, the print head N is lowered into a park position and capped by a sealing cap 120 (FIG. 3), 220 (FIGS. 4–5) of the ink receptacle assembly 122 (FIG. 3), 222 (FIGS. 4–5).

FIG. 10C shows remove tray positions generally indicated as 390 of the print head N in relation to the ink receptacle assembly 222. As shown, the print head N is lowered into the park position and the ink receptacle assembly 222 is positioned away from the print head for handling by an operator. The handling may include replacing the cover 223, the sealing caps 220, the wipers 218, or a combination thereof. Typically, the cleaning receptacle is replaced when entirely full.

FIG. 11: Print Cycle Flowchart

FIG. 11 shows a flowchart generally indicated as 400 of the print commands, which include:

a step 402 for receiving a print command;

a step 404 for checking if the print head N (see FIGS. 1–3 and 10) is in a park position;

a step 406 for spitting the print head if the print head is in the park position;

a step 408 for checking a vertical home sensor 312 (see FIG. 8) and in a step 410 moving the print head to a vertical home position if the print head is not in the vertical home position, or a step 412 for checking for a move up jam in the print head;

a step 414 for checking a horizontal home sensor 310 (see FIGS. 4–5 and 8) and a step 416 for moving the ink receptacle assembly to a horizontal home position if the ink receptacle assembly 222 is not in the horizontal home position, or a step 418 for checking for a move in jam in the ink receptacle assembly 222;

a step 420 for extending the ink receptacle assembly 222 to a tray print position, or a step 422 for checking for a move out jam in the ink receptacle assembly 222; and a step 424 for lowering the print head to a print position, or a step 426 for checking for a move down jam in the print head.

The flowchart 400 ends with either a step 428 for a status report of "NO ERROR", or a step 430 for a status report of "ERROR ID".

The implementation of the print cycle flowchart 400 in FIG. 11 is shown and described herein by way of example. However, the scope of the invention is not intended to be limited to any particular type of the software implementation thereof. For example, the scope of the invention is intended to include other types of software implementations of the print cycle that fall within the spirit of the present invention. The inventors envision that many different types of software implementations of the print cycle may be implemented by a person skilled in the art after reading that disclosed in the instant patent application.

FIG. 12: Park Cycle Flowchart

FIG. 12 shows a flowchart generally indicated as 500 of the park cycle commands, which include:

a step 502 for receiving a park command;

a step 504 for checking the vertical home sensor 312 (see FIG. 8) and in a step 504a moving the print head to the vertical home position if the print head is not in the vertical home position, or a step 504b for checking for a move up jam in the print head;

a step 506 for checking the horizontal home sensor 310 (see FIGS. 4–5 and 8) and a step 506a for moving the ink receptacle assembly 222 to the horizontal home position if the ink receptacle assembly 222 is not in the horizontal home position, or a step 506b for checking for a move in jam in the ink receptacle assembly 222;

a step 508 for lowering the print head to a spit position;

a step 510 for spitting the print head; and a step 512 for moving the print head to the vertical home position, or a step 512a for checking for a move up jam in the print head; and a step 514 for lowering the print head to a cap position, or a step 514b for checking for a move down jam in the print head.

The flowchart 500 ends with either a step 516 for a status report of "NO ERROR", or a step 518 for a status report of "ERROR ID".

The implementation of the park cycle flowchart 500 in FIG. 12 is shown and described herein by way of example. However, the scope of the invention is not intended to be limited to any particular type of the software implementation thereof. For example, the scope of the invention is intended to include other types of software implementations of the park cycle that fall within the spirit of the present invention. The inventors envision that many different types of software implementations of the park cycle may be implemented by a person skilled in the art after reading that disclosed in the instant patent application.

FIG. 13: Cleaning Cycle Positions

FIG. 13 shows cleaning cycle positions of the print head N in relation to the ink receptacle assembly 122, 222 (see also FIGS. 3–5).

FIG. 13A shows start positions generally indicated as 530 of the print head N in relation to the ink receptacle assembly 122, 222. As shown, the sealing cap 120, 220 of the ink receptacle assembly 122, 222 is moved below the print head N.

FIG. 13A' shows print positions generally indicated as 540 of the print head N in relation to the ink receptacle assembly 122, 222. As shown, the ink receptacle assembly 122, 222 is moved away from the print head N.

FIG. 13B shows spit positions generally indicated as 550 of the print head N in relation to the ink receptacle assembly 122, 222. As shown, the sealing cap 120, 220 of the ink receptacle assembly 122, 222 is positioned below the print head N.

FIG. 13C shows wipe positions generally indicated as 560 of the print head N in relation to the ink receptacle assembly 122, 222. As shown, the ink receptacle assembly 122, 222 is moved in so the wiper 218 wipes the print head N.

FIG. 13D shows wick positions generally indicated as 570 of the print head N in relation to the ink receptacle assembly 122, 222. As shown, the ink receptacle assembly 122, 222 is moved out so the wiper 218 wicks the print head N.

FIG. 14 shows an example of the wiper 218 having a sharp-edged wiping surface 218a and a rounded-edge wicking surface 218b.

FIG. 15: Cleaning Cycle Flowchart

FIG. 15 shows a flowchart generally indicated as 600 of the cleaning cycle commands, which include:

a step 602 for receiving a clean command;

a step 604 for checking the vertical home sensor 312 (see FIG. 8) and in a step 606 moving the print head to the vertical home position if the print head is not in the vertical home position, or a step 608 for checking for a move up jam in the print head;

a step 610 for checking the horizontal home sensor 310 (see FIGS. 4–5 and 8) and a step 612 for moving the ink receptacle assembly 222 to the horizontal home position if the ink receptacle assembly 222 is not in the horizontal home position, or a step 614 for checking for a move in jam in the ink receptacle assembly 222;

a step 616 for lowering the print head to a spit position, or a step 618 for checking for a move down jam in the print head;

a step 620 for spitting the print head;

a step 622 for moving the print head to a vertical home position, or a step 624 for checking for a move up jam in the print head;

a step 626 for lowering the print head to a wick position, or a step 628 for checking for a move down jam in the print head;

a step 630 for extending the ink receptacle assembly 222 to a tray wipe position, or a step 632 for checking for a move out jam in the ink receptacle assembly 222;

a step 634 for moving the print head to the vertical home position, or a step 636 for checking for a move up jam in the print head;

a step 638 for lowering the print head to a wipe position, or a step 640 for checking for a move down jam in the print head;

a step 642 for moving the ink receptacle assembly 222 to a home position, or a step 644 for checking for a move jam in the ink receptacle assembly 222;

a step 646 for lowering the imager below a home sensor, or a step 648 for checking for a move down jam in the print head;

a step 650 for moving the print head to the vertical home position, or a step 652 for checking for a move up jam in the print head; and a step 654 for moving the print head down to the cap position, or a step 656 for checking for a move down jam in the print head.

The flowchart 600 ends with either a step 658 for a status report of "NO ERROR", or a step 660 for a status report of "ERROR ID".

The implementation of the clean cycle flowchart 600 in FIG. 15 is shown and described herein by way of example. However, the scope of the invention is not intended to be limited to any particular type of the software implementation thereof. For example, the scope of the invention is intended to include other types of software implementations of the clean cycle that fall within the spirit of the present invention. The inventors envision that many different types of software implementations of the clean cycle may be implemented by a person skilled in the art after reading that disclosed in the instant patent application.

FIG. 16: Remove Tray Cycle Flowchart

FIG. 16 shows a flowchart generally indicated as 700 of the remove tray commands, which include:

a step 702 for receiving a remove tray command;

a step 704 for checking the vertical home sensor 312 (see FIG. 8) and in a step 706 moving the print head to the vertical home position if the print head is not in the vertical home position, or a step 708 for checking for a move up jam in the print head;

a step 710 for checking the horizontal home sensor 310 (see FIGS. 4–5 and 8) and a step 712 for moving the ink receptacle assembly 222 to the horizontal home position if the ink receptacle assembly 222 is not in the horizontal home position, or a step 714 for checking for a move in jam in the ink receptacle assembly 222; and a step 716 for extending the ink receptacle assembly 222 to a remove tray position, or a step 718 for checking for a move out jam in the ink receptacle assembly 222.

The flowchart 700 ends with either a step 720 for a status report of "NO ERROR", or a step 722 for a status report of "ERROR ID".

The implementation of the remove tray cycle flowchart 700 in FIG. 16 is shown and described herein by way of example. However, the scope of the invention is not intended to be limited to any particular type of the software implementation thereof. For example, the scope of the invention is intended to include other types of software implementations of the remove tray cycle that fall within the spirit of the present invention. The inventors envision that many different types of software implementations of the remove tray cycle may be implemented by a person skilled in the art after reading that disclosed in the instant patent application.

THE SCOPE OF THE INVENTION

It will, therefore, be seen from the above that the invention described admirably achieves the objects of the invention. However, it will be appreciated that departures can be made by those skilled in the art without departing from the spirit and scope of the invention, which is limited only by the following claims.

We claim:

1. An imager having a print head for arranging directly over a production path, characterized in that the print head moves only on an axis perpendicular to the plane of the production path for allowing the print head to be purged, cleaned, parked, or a combination thereof, while the print head remains directly over the production path.

2. An imager according to claim 1, characterized in that the imager includes a mechanical coupling having a motor, a gear assembly and a vertical drive screw for vertically moving the print head.

3. An imager having a print head for arranging directly over a production path, the print head vertically moving on an axis perpendicular to the plane of the production path for allowing the print head to be purged, cleaned, parked, or a combination thereof, while the print head remains directly over the production path, the imager having a mechanical coupling with a color, a gear assembly and a vertical drive screw for vertically moving the print head, the imager including a cartridge assembly having the motor and the gear assembly arranged therein, and the imager also including a service station assembly having the vertical drive screw attached thereto.

4. An imager having a print head for arranging directly over a production path, the print head vertically moving on an axis perpendicular to the plane of the production path for allowing the print head to be purged, cleaned, parked,or a combination thereof, while the print head remains directly over the production path, the imager having a mechanical coupling with a motor, a gear assembly and a vertical drive screw for vertically moving the print head, and the gear assembly having a vertical drive gear with inner threads for coupling to outer threads of the vertical drive screw.

5. An imager according to claim 4, characterized in that the gear assembly has a pinion gear coupled between the vertical drive gear and a shaft of the motor.

6. An imager according to claim 5, characterized in that the vertical drive gear and the pinion gear are arranged in a power transmission housing of the motor.

7. An imager according to claim 1, characterized in that the imager includes a service station assembly having an ink receptacle assembly that moves horizontally in relation to an axis parallel to the plane of the production path for purging, cleaning or parking the print head, or a combination thereof, while the print head remains directly over the production path.

8. An imager according to claim 7, characterized in that the imager includes a mechanical coupling having a motor, a first gear assembly, a square drive shaft, a second gear assembly and a receptacle drive shaft for horizontally moving the ink receptacle assembly.

9. An imager according to claim 8, characterized in that the imager includes a cartridge assembly having the motor and the first gear assembly arranged therein, and the service station assembly includes the square drive shaft, the second gear assembly and the receptacle drive shaft arranged therein.

10. An imager according to claim 8, characterized in that the first gear assembly has a square drive gear for coupling to the square drive shaft.

11. An imager according to claim 10, characterized in that the first gear assembly also has a pinion gear for coupling between the square drive gear and a shaft of the motor.

12. An imager according to claim 11, characterized in that the square drive gear and the pinion gear are arranged in a power transmission housing of the motor.

13. An imager according to claim 8, characterized in that the second gear assembly has two helical right gears coupled together, a first helical right gear connects to the square drive shaft, and a second helical right gear connects to the receptacle drive shaft.

14. An imager having a print head for arranging directly over a production path, the print head vertically moving on an axis perpendicular to the plane of the production path for allowing the print head to be purged, cleaned, parked,or a combination thereof, while the print head remains directly over the production path, the imager a service station assembly with an ink receptacle assembly that moves horizontally in relation to an axis parallel to the plane of the production path for purging, cleaning or parking the print head, or a combination thereof, while the print head remaining directly over the production path, and the ink receptacle assembly being slidably arranged in the service station assembly.

15. An imager having a print head for arranging directly over a production path,
- the print head vertically moving on an axis perpendicular to the plane of the production path for allowing the print head to be purged, cleaned, parked,or a combination thereof, while the print head remains directly over the production path,
- the imager a service station assembly with an ink receptacle assembly that moves horizontally in relation to an axis parallel to the plane of the production path for purging, cleaning or parking the print head, or a combination thereof, while the print head remaining directly over the production path, and
- the ink receptacle assembly having a receptacle cover having either one or more pen cap seals for sealing one or more print heads, or one or more wipers for wiping the ink off the one or more print heads, or a combination thereof.

16. An imager having a print head for arranging directly over a production path,
- the print head vertically moving on an axis perpendicular to the plane of the production path for allowing the print head to be purged, cleaned, parked, or a combination thereof, while the print head remains directly over the production path,
- the imager a service station assembly with an ink receptacle assembly that moves horizontally in relation to an axis parallel to the plane of the production path for purging, cleaning or parking the print head, or a combination thereof, while the print head remaining directly over the production path, and
- the imager includes a cleaning station control circuit assembly for vertically moving the print head and for horizontally moving the ink receptacle assembly.

17. An imager according to claim 16, characterized in that the cleaning station control circuit assembly includes a cleaning station processor, a motor control interface, a vertical motor, a horizontal motor, a vertical motor encoder and a horizontal encoder.

18. An imager according to claim 16, characterized in that the cleaning station control circuit assembly also includes a vertical home sensor, a horizontal home sensor and a paper sensor trigger.

19. An imager according to claim 18, characterized in that the cleaning station control circuit assembly also includes an interface processor coupled to the cleaning station processor for interfacing input and output information signals to and from the cleaning station control circuit assembly.

* * * * *

UNITED STATES PATENT AND TRADEMARK OFFICE
CERTIFICATE OF CORRECTION

PATENT NO. : 6,837,636 B2
DATED : January 4, 2005
INVENTOR(S) : Sawyer et al.

It is certified that error appears in the above-identified patent and that said Letters Patent is hereby corrected as shown below:

Column 11,
Line 61, "color" should be -- motor --.

Column 12,
Line 64, "remaining" should be -- remains --.

Column 13,
Line 18, after "Imager" -- having -- should be inserted.
Line 12, "remaining" should be -- remains --.

Column 14,
Line 5, "remaining" should be -- remains --.
Line 24, after claim 19, claims 47-55 should be inserted as follows:

47. An imager for arranging directly over a production path, comprising:
  a cartridge assembly having a print cartridge with a print head that moves only on an axis perpendicular to the plane of the production path for allowing the print head to be purged, cleaned, parked, or a combination thereof, while the print head remains directly over the production path; and
  a service station assembly having a waste ink receptacle that horizontally moves in relation to an axis parallel to the plane of the production path for purging, cleaning or parking the print head, or a combination thereof, while the print head remains directly over the production path.

48. An imager for arranging directly over a production path, comprising:
  a cartridge assembly having a print cartridge with a print head that vertically moves only on an axis perpendicular to the plane of the production path for allowing the print head to be purged, cleaned, parked, or a combination thereof, while the print head remains directly over the production path; and
  a service station assembly having a waste ink receptacle that horizontally moves in relation to an axis parallel to the plane of the production path for purging, cleaning or parking the print head, or a combination thereof, while the print head remains directly over the production path, the waste ink receptacle being a snap-in disposable assembly consisting of a reservoir for waste ink, soft rubber capping seals and soft rubber pen wipers.

49. An imager according to claim 48, wherein the reservoir contains porous foam for absorption and dispersion of waste ink.

UNITED STATES PATENT AND TRADEMARK OFFICE
CERTIFICATE OF CORRECTION

| | |
|---|---|
| PATENT NO. | : 6,837,636 B2 |
| DATED | : January 4, 2005 |
| INVENTOR(S) | : Sawyer et al. |

It is certified that error appears in the above-identified patent and that said Letters Patent is hereby corrected as shown below:

Column 14 (cont'd),

50.    An imager according to claim 47, wherein the waste ink receptacle assembly slides within the service station assembly by way of software commanded motors, the service station assembly performing functions of pen wiping and cleaning, proper nozzle firing verification and capping of pens when not in use.

51.    An imager for arranging directly over a production path, comprising:
     a cartridge assembly having a print cartridge with a print head that vertically moves only on an axis perpendicular to the plane of the production path for allowing the print head to be purged, cleaned, parked, or a combination thereof, while the print head remains directly over the production path, the cartridge assembly having a cartridge lift motor for lifting the cartridge assembly a precise distance at pre-determined intervals or upon command in relation to the service station assembly ; and
     a service station assembly having a waste ink receptacle that horizontally moves in relation to an axis parallel to the plane of the production path for purging, cleaning or parking the print head, or a combination thereof, while the print head remains directly over the production path, the waste ink receptacle assembly sliding within the service station assembly by way of software commanded motors, the service station assembly performing functions of pen wiping and cleaning, proper nozzle firing verification and capping of pens when not in use.

52.    An imager according to claim 51, wherein the cartridge assembly includes a wiper/ink receptacle driver motor for driving the waste ink receptacle under a nose of the print head thereby wiping one or more pen nozzles to remove excess ink residue.

53.    An imager according to claim 52, wherein the wiper/ink receptacle driver motor retracts the waste ink receptacle to allow resumed printing, or the cartridge assembly lift motor lowers the cartridge assembly to allow the soft rubber capping seals to cap pens to prevent drying of the one or more pen nozzles until next use.

54.    An imager according to claim 1, characterized in that the production path has a conveyor belt having products to be printed moving thereon and underneath the print head.

UNITED STATES PATENT AND TRADEMARK OFFICE
CERTIFICATE OF CORRECTION

PATENT NO.   : 6,837,636 B2
DATED        : January 4, 2005
INVENTOR(S)  : Sawyer et al.

It is certified that error appears in the above-identified patent and that said Letters Patent is hereby corrected as shown below:

Column 14 (cont'd),
    55.    An imager according to claim 1, characterized in that the production path is a continuous web to be printed moving underneath the print head.

Signed and Sealed this

Twenty-seventh Day of December, 2005

JON W. DUDAS
*Director of the United States Patent and Trademark Office*